Aug. 1, 1939. J. MANN 2,167,988
SEPARATION APPARATUS
Filed Nov. 22, 1937 2 Sheets-Sheet 1
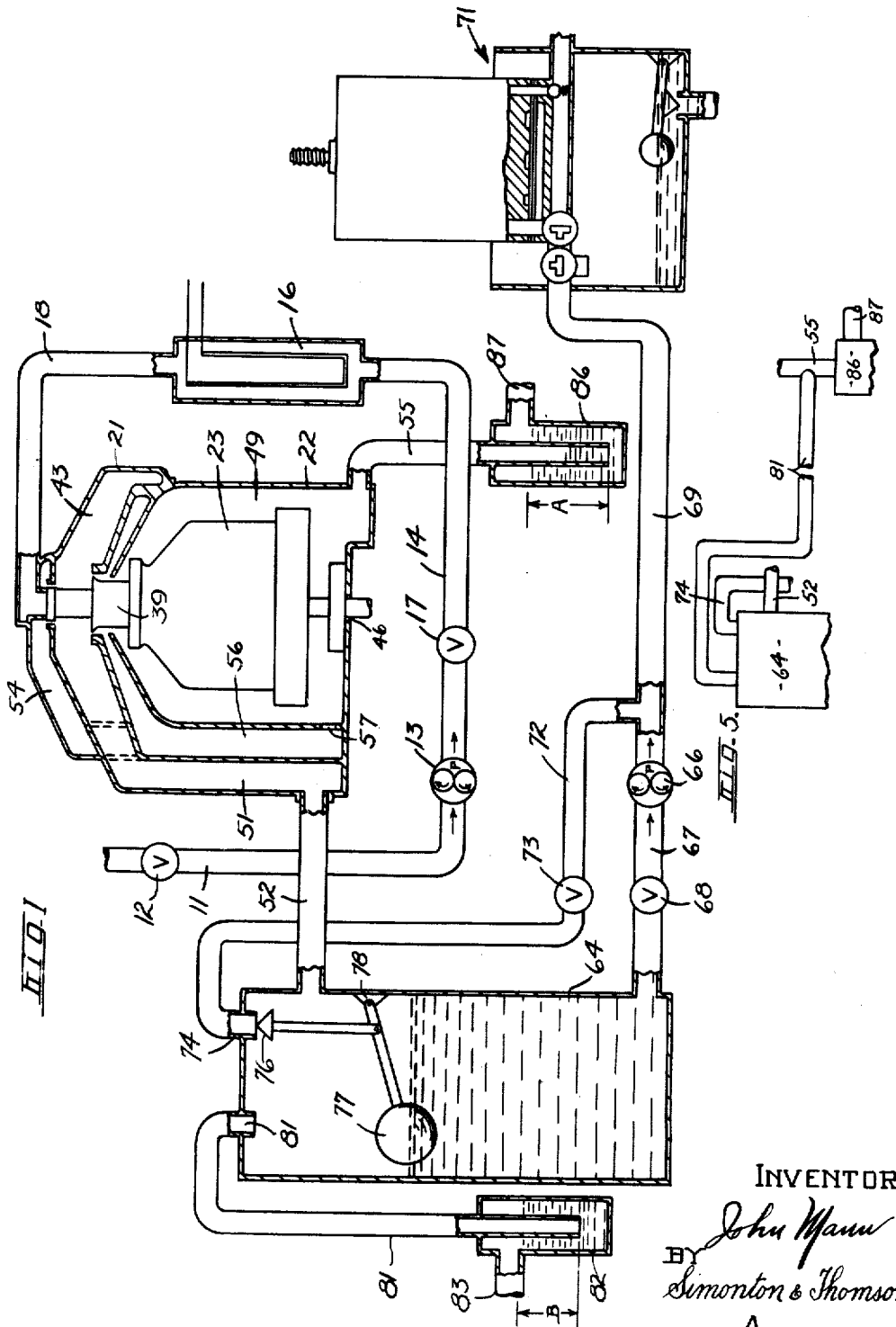

Aug. 1, 1939.                    J. MANN                    2,167,988
                          SEPARATION APPARATUS
                          Filed Nov. 22, 1937           2 Sheets-Sheet 2
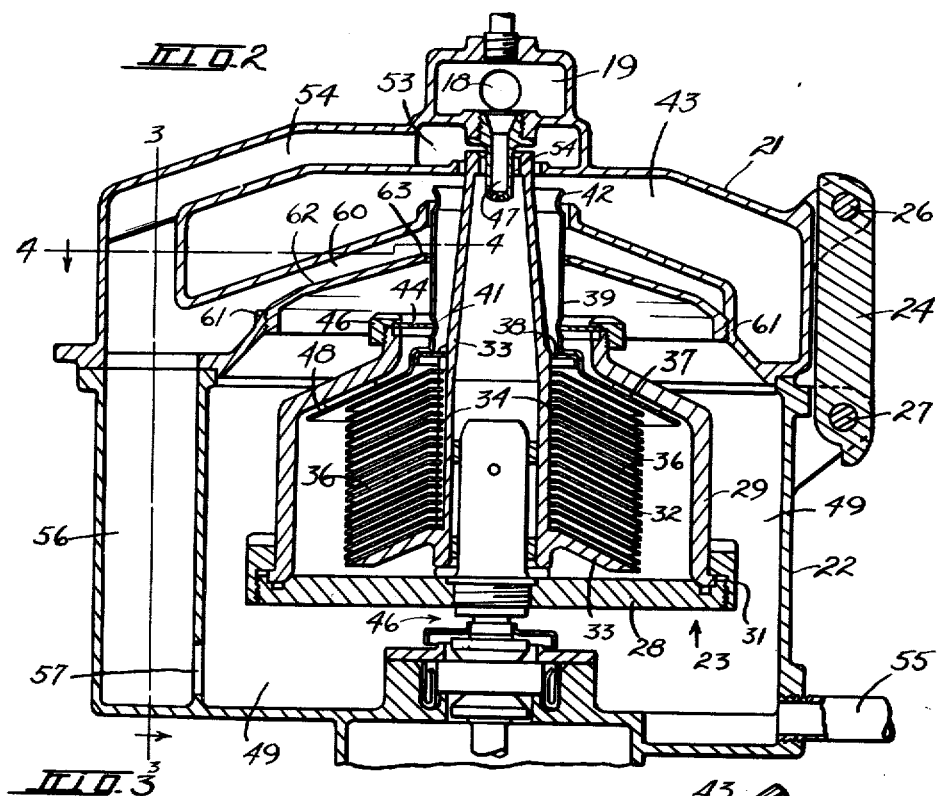
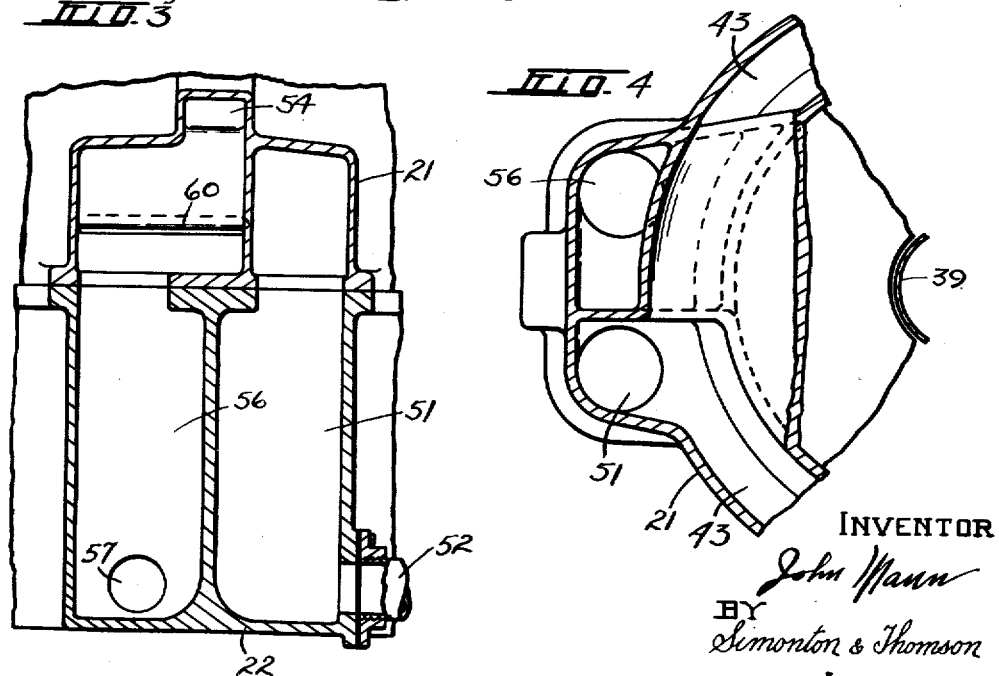
INVENTOR
John Mann
BY Simonton & Thomson
ATTORNEYS Patented Aug. 1, 1939

2,167,988

UNITED STATES PATENT OFFICE 2,167,988

SEPARATION APPARATUS

John Mann, Seneca Falls, N. Y., assignor to Goulds Pumps, Inc., Seneca Falls, N. Y., a corporation of New York Application November 22, 1937, Serial No. 175,869

4 Claims. (Cl. 233—21)

My invention relates to apparatus for removing impurities from liquids, particularly oils for insulating or lubricating purposes. More particularly, my invention relates, in a centrifugal separating apparatus, to a novel method and means for preventing the recontamination of purified oil with water or the carrying off and loss of a portion of the good, purified oil with the waste water separated from the oil.

Although my invention has general application, it is particularly adapted for use in purifying oils wherein even comparatively slight traces of moisture in the purified oil renders the oil unsuitable for its desired purpose. While, as stated, my invention has general application, it is particularly adapted for use in connection with apparatus for purifying insulating oils for transformers, induction voltage regulators, oil fuse cutouts, industrial control devices and oil circuit breakers.

Considerable care is taken in the preparation and transportation of insulating oils, particularly those intended for transformer service. Even slight traces of moisture in the oil renders it unfit for use as it impairs the dielectric strength of the oil. When the oil is tested between circular disk electrodes one inch in diameter and with a spark gap of one-tenth inch, the oil should have a dielectric strength of at least twenty to twenty-five thousand volts. A very slight amount of moisture in the oil, perhaps absorbed from the air unless special care is taken, will so materially reduce the dielectric strength of the oil as to render it unfit for transformer use. So important is the consideration, that transformer oils be substantially free of moisture, that not only is special care taken in the refining process to secure an oil which will not hold water in solution, but also every possible safeguard is used in the transportation of the oil from the refiner to the user, its storage and placement in service to prevent the oil from absorbing moisture from the air.

While, as pointed out above, the preparation of the transformer oil for service and proper safeguards in its transportation are important, of equal importance, after the oil has been in service for a time, is its purification to remove scale, carbon particles and other impurities, and particularly the reduction of the moisture content to an absolute minimum. I have found that the usual commercial centrifugal separator, while effective under most conditions to recondition the oil for transformer use, will at times fail to deliver a purified oil of the required low moisture content. This failure, I believe, is due to recontamination of the oil with moisture after the moisture has once been removed by the separator. At least, I have found that when means are employed to prevent the recontamination of the separated oil, the moisture content of the purified oil is materially reduced and the dielectric strength of the oil appreciably increased. Moreover, the source of the moisture by which the oil is recontaminated is difficult to ascertain but I believe that the fan effect of the rotating bowl of the separator and the flow of air induced by the discharge of oil from the bowl at high velocity creates a pressure of air in the direction of flow of purified oil from the rotating bowl. The air flow thus created picks up moisture from the waste water and this moisture laden air remixes with the purified oil. In addition, it is probable that moisture laden air is drawn from outside the system either through the waste water outlet or through the driving mechanism of the rotating bowl and that this moisture laden air is carried over into the purified oil outlet and picked up by the oil.

An object of my invention is, therefore, to provide a novel means, in a centrifugal oil separator system, of reducing the moisture content of the purified oil to a minimum and thereby increase the dielectric strength of the purified oil.

Another object of my invention is the provision, in a centrifugal oil separator system, of novel means for de-aerating the purified oil.

A further object of my invention is to provide a means, in a centrifugal oil separator system, of preventing any recontamination of the separated oil with moisture.

My invention further contemplates the provision of a novel means, in a centrifugal oil separator system, of preventing good oil from being carried out of the system with the waste water.

In addition, my invention contemplates, in a centrifugal oil separator system, the creation of a slight pressure throughout the system to thereby prevent the infiltration of moisture laden air into the system and the effective sealing of the waste water outlet and the air outlet from the system against the ingress of moisture laden air.

Still another object of my invention is the provision, in a centrifugal oil separator system, of adjustable means for sealing all possible places against the ingress of moisture laden air, the adjustment enabling the balancing of the pressure inside the system against outside pressure whereby moisture laden air is prevented from remixing with the purified oil and thus contaminating it.

More specifically, my invention contemplates, in a centrifugal oil separator system, the sealing of the waste water outlet of the system against the ingress of air and the provision in the clean oil discharge outlet of an air outlet which may be adjusted so as to regulate the pressure in the system and thereby prevent the infiltration of moisture laden air into the system and the possibility of an air flow from the waste water outlet of the system toward the clean oil discharge passages and the consequent recontamination of the purified oil with moisture.

Other objects and advantages of my invention will be more apparent from the following description when taken in connection with the accompanying drawings, in which:

Figure 1 is a diagrammatic view showing the oil separator system in which my invention is embodied.

Figure 2 is a somewhat detailed cross sectional view showing the rotating bowl and the housing therefor of the centrifugal oil separator system.

Figure 3 is a view taken on the line 3—3 of Figure 2 in the direction indicated by the arrow.

Figure 4 is a view taken on the line 4—4 of Figure 2 in the direction indicated by the arrow.

Figure 5 is a view of a portion of Figure 1 showing another way by which the system may be sealed against the ingress of moisture laden air.

The oil to be purified enters the separator system, from a source of used oil such as a transformer, through a pipe 11 controlled by a valve 12. The contaminated oil is drawn into the system by means of a pump 13 which may be of the rotary gear type and is pumped through a line 14 to a heater 16. The heater may be of the circulating type provided with immersion heating elements. The heater 16 is for the purpose of heating the oil to a temperature such that its viscosity is materially reduced to enable better separation. A valve 17 regulates the flow of oil to the system. If desired, the valve 17 may be of the adjustable by-pass type so that when the flow of oil to the system is too great for the capacity of the machine, a portion of the oil from the pump will by-pass back to the suction of the pump. From the heater, the oil flows through a line 18 under the pressure of the pump 13 into a chamber 19 at the top of the head or what is known as the collecting pan 21 of the separator.

The collecting pan 21, as shown in Figure 2, fits down over a casting which constitutes a housing 22 for the centrifuge or rotating bowl 23. The collecting pan 21 is hinged with respect to the housing 22 by means of hinge links 24 pivoted, at 26, to the collecting pan and, at 27, to the housing. Suitable latch means, not shown, are provided for releasably securing the collecting pan to the housing.

The centrifugal element or rotating bowl 23 comprises a bowl base 28, a bowl shell 29 and a bowl nut 31 for retaining the bowl shell in assembled relationship with the base. The rotating bowl itself constitutes no part of my present invention and, therefore, need not be more particularly described than to state that the bowl has mounted therein a plurality of disks 32 which are suitably mounted, in spaced superimposed relationship, on a disk holder 33. The disks are suitably apertured, at 34 and at 36, to enable the separated oil to pass upwardly around the outer circumference of the disk holder. Above the disks 32 is a dividing cone 37 which is carried by a plate 38 supported from the disk holder. At its upper end, the dividing cone 37 merges into a cylindrical upwardly extending portion 39 which has formed therein, at 41, an oil dam of fixed diameter.

The cylindrical portion 39 extends upwardly concentric with the disk holder 33 and, at its upper end, as at 42, is curved slightly inward and then outward to form an oil discharge lip. Oil separated in the bowl flows over the lip of the cylindrical portion 39 of the dividing cone 37 into a clean oil collecting chamber 43 formed in the collecting pan 21. A water dam 44, comprising an annular plate held in place by a nut 46, is concentric with the cylindrical portion 39 of the dividing cone 37. The water dam may be replaced by one of different size to adapt the rotating bowl to separate oils of different specific gravities, as is well known in the art to which this invention applies.

It is unnecessary to describe the operation of the separating bowl in any great detail since the operation of a centrifugal separator is well known in the art to which this invention applies. It is sufficient to state that the bowl which is mounted on a spindle assembly, generally indicated by the numeral 46, after being primed, is rotated at high speed by mechanism, not shown. Oil entering from the chamber 19 through the nozzle 47, either continuously or in batches, flows down on the inside of the disk holder 33 where, by centrifugal force, it is thrown against the walls thereof. The dirty oil flows down along the inner walls of the disk holder 33 until it reaches the bowl base 28. The liquid, due to centrifugal force, then stratifies the heavier water and solids being thrown to the outside of the bowl, while the lighter oil remains or is forced toward the center of the bowl. The separation of the oil and water takes place at about the point indicated on the dividing cone by the numeral 48. Water flows upward above the dividing cone 37 and past the water dam 44 into the chamber 49 formed by the housing 22. The oil flows upward through disk apertures 32 and 36 and on the underside of the dividing cone 37 past the oil dam 41 and then upward along the walls of the cylindrical portion 39 of the dividing cone 37 from where it is discharged into the clean oil collecting pan 43 at a fairly high velocity. It will be understood that the specific type of separator does not constitute a part of my present invention and that any type of conventional separating equipment may be employed.

Oil from the clean oil collecting pin 43 flows downward through a passageway 51 in the housing 22, shown in Figures 3 and 4, to a clean oil discharge line 52, shown in Figures 1 and 3. Waste water flows from the chamber 49 through a waste water discharge line 55.

In the event that the oil should be fed through the nozzle 47 too rapidly to be handled by the bowl, an overflow is provided by forming in the collecting pan 21 a chamber 53 which is open, as indicated at 54, to the interior of the disk holder 33. The overflow oil gravitates from the chamber 53 through a passage 54, downward through a passage 56 in the housing to an opening 57 which is connected to the waste water outlet 55.

A dividing plate 62 is threaded, at 61, into a portion of the casting forming the collecting pan 21. A passageway 60, formed in the collecting pan casting between the lower side of the clean oil collecting pan 43 and the dividing plate 62, is in communication with the passageway 56 constituting the oil overflow outlet. At its inner end, as indicated at 63, the dividing plate 62 is concentric with and slightly spaced from the cylindrical portion 39 of the dividing cone 37 so that the chamber 49, passage 60 and the clean oil collecting pan 43 are in communication with each other.

The clean oil discharge line 52 empties into an air separating tank 64. The clean oil, leaving the rotating bowl contains a considerable amount of entrained air, thus causing the oil to be somewhat foamy when it reaches the air separating tank 64. Foamy oil, containing entrained air, is unsatisfactory for returning direct to the transformer or switch and provision must be made to liberate this air from the oil.

A pump 66, in a line 67, having a valve 68, draws oil from the air separating tank 64 and pumps it through a line 69 either directly to the transformer or to a filter press, generally indicated by the numeral 71. It is unnecessary to describe the filter press since the operation of a filter press is well known in the art to which this invention applies. It is sufficient to state that the oil is passed through a series of filters which remove impurities from the oil which may not have been removed by the centrifugal separation operation.

A by-pass line 72, provided with a valve 73, extends from the line 69 to the top of the air separating tank 64, as indicated at 74. The outlet of the pipe 72 is controlled by a valve 76 which is connected to a float 77. The float 77 is suitably arranged in the air separating tank, as indicated at 78, so that the valve 76 will open and close in accordance with the level of the oil in the air separting tank. When the oil drops below a predetermined level, the valve 76 is opened and oil is by-passed through the pipe 72 back to the air separating tank 64. When the oil reaches the level for which the float is set, the valve 76 is closed and the oil is pumped through the line 69 to the filter press 71. If no filter press is used, some means must be provided in the line 69 to build up a resistance so that when the valve 76 is open, the oil will by-pass through the pipe 72 back into the air separating tank 64. The air separating tank 64 is thus kept at a substantially constant level and the entrained air in the oil has an opportunity to liberate itself from the oil and pass out through an air discharge line 81 before being pumped to the transformer or filter press.

I have found that the purified oil discharged into clean oil collecting pan 43 is in some manner recontaminated with moisture. This recontamination of the purified oil, as mentioned above, may be due to certain phenomenon occurring within the bowl and its associated housing. A fan effect is caused by the rapidly rotating bowl. This fan effect is, of course, greatest adjacent the periphery of the base 23 of the bowl and the bowl nut 31 and least near the top of the bowl. The flow of air caused by the rotating bowl is normally directed toward the waste water outlet. However, at times, a current of air is, I believe, created by the bowl through the chamber 49 in an upward direction around the cylindrical portion 39 of the dividing cone 37 and toward the clean oil discharge line 52. This current of air, I believe, picks up moisture from the chamber 49, through which the separated water flows to the waste water discharge line 55, and carries it into the clean oil passages where it remixes with purified oil. Moreover, the velocity of oil discharge from the rotating bowl may cause a suction effect externally of and adjacent the top of the cylindrical portion 39 of the dividing cone 37. This suction effect, I believe, produces induced air currents flowing from the chamber 49 toward the clean oil discharge line 52. These currents of air, produced as a result of either or both of these causes, I will, for convenience, term "centrifugal head". The currents of air flowing from the chamber 49 toward the clean oil discharge perhaps create a slight sub-atmospheric pressure in the chamber 49 and air withdrawn from the chamber 49 is probably replaced by air drawn into the chamber through the waste water discharge outlet 55 and by air drawn into the chamber around the spindle assembly 46. This air drawn from the room is, of course, moisture laden. In addition, a certain amount of air probably enters the system with the dirty oil.

Whatever may be the cause of the recontamination of the purified oil with water, I have found that the moisture content of the purified oil may be reduced and thereby the dielectric strength of the purified oil increased by the method and means of my invention.

In accordance with my invention, at the end of the waste water outlet I provide a seal to effectively prevent the escape of air at this point. This may be accomplished by extending the waste water outlet line 55 into a vessel 86 which is filled with water or other liquid to a level a few inches above the lower end of the waste water outlet, as shown in Figure 1. This produces a water column A which effectively prevents a flow of air from the chamber 49 through the water outlet while still permitting waste water to pass out of the overflow 87. Moreover, the water column A seals the water outlet against the entrance of air. The water column A should be of sufficient heighth to prevent the escape of air under any conditions of pressure which may arise in the system. Further, in accordance with my invention, the air discharge line 81 from the air separating tank 64 has its outer end extended into a vessel 82. The vessel 82 is filled with water or other liquid and has an air outlet 83. The lower end of the air discharge line 81 extends below the surface of the water so as to form a water column B. The provision of the water column B requires, before air may be discharged from the air separating tank through the discharge line 81 and bubble up through the water column, that a pressure of air be created in the air separating tank sufficient to overcome the head of the water in the water column B. The head of the water in the vessel 82 need only be that of a few inches of water—just sufficient to slightly overbalance the centrifugal head described above.

Preferably, in the operation of my system the water column A is made sufficiently deep to plug that opening against the ingress or egress of air, and the heighth of the water column B is adjusted until a smoke indicator, placed adjacent the bowl spindle 46, indicates a condition at which there is no inflow of air around the spindle. Preferably, the heighth of the water column B is made such that there is a balanced condition adjacent the spindle of neither an inflow nor an outflow of air. Since all other points in the system are sealed, except around the spindle 46 which cannot be sealed, there can be no ingress of moisture laden air into the system.

In Figure 5 I have shown a modified form of the system above described in which the air discharge pipe 81 from the separating tank is connected to the waste water outlet pipe 55. With this set-up, only one water column is used, namely, the water column A which is adjusted in heighth until a smoke indicator indicates a neutralized condition adjacent the bowl spindle.

My invention, if desired, may also be applied to a clarifier system, that is, when the oil entering the system is free from moisture and it is merely necessary to remove solid impurities. In a clarifier system, the water passage above the dividing cone 37 is closed and while there is much less possibility of the oil being contaminated by moisture in a clarifier system, still the means of my invention will minimize the possibility of moist air being drawn into the system from sources externally thereof.

While I have shown and described the preferred means by which recontamination of the oil with moisture may be prevented, which means I believe superior to others I have considered, it will be appreciated that other means may be employed for balancing the so-called centrifugal head. For example, instead of utilizing the water column B, a check valve backed up by a light spring might be placed in the air discharge line 81. The valve spring would be of such strength as to open when a slight pressure is existent in the air discharge line 81. Similarly, the water column A may be replaced by a spring loaded check valve which would open when sufficient pressure existed in the waste water discharge line 55. However, I believe the means shown herein to be superior because the water columns are extremely sensitive and accurate adjustment may be obtained.

It will be apparent that other changes and modifications may be made in the form and relationship of the elements of the oil separator system without departing from the spirit of my invention as set forth in the appended claims.

I claim:

1. In a separator system, in combination, a centrifugal separator having discharges for oil and for water, a casing surrounding the centrifugal separator, said casing including an inlet for oil to be purified and separate compartments for receiving oil and water, a waster water outlet pipe communicating with the water compartment, means for sealing the waste water pipe, an oil discharge means communicating with the oil compartment of the casing, said means including separate outlets for air and oil, a sealed discharge for oil, and a water leg arranged in the air outlet.

2. In a separator system, in combination, a centrifugal separator having a discharge for oil and a discharge for water, a casing surrounding the centrifugal separator, said casing including an inlet for oil to be purified, and separate compartments for receiving oil and water, a waste water outlet pipe communicating with the water compartment, means for sealing the waste water pipe, an oil discharge communicating with the oil compartment of the casing, an adjustable water leg in connection with said oil discharge in said system so that at points in the system which cannot be sealed there is no ingress of air.

3. In a centrifugal separator system, in combination, a centrifugal separator having a discharge for at least one of the constituents to be separated, a casing surrounding the centrifugal separator, said casing including a sealed inlet for the material to be separated, a compartment for receiving the constituent discharged from the centrifugal separator, a discharge from said compartment for said constituent, means in said discharge for separating air from said constituent and discharging the air from said system, and means for regulating the pressure at which the separated air is discharged from said system so that the pressure of air in the system is such as to prevent the ingress of air through any leakage openings into the system.

4. In a separator system, in combination, a centrifugal separator for separating oil and impurities, a casing adjacent said centrifugal separator having separate compartments for receiving oil and waste water, a clean oil discharge from said casing, said clean oil discharge being sealed against ingress or egress of air, means for separating air from the clean oil including a separate outlet for air, a waste water discharge from said casing including a waste water outlet, said air outlet being connected to said waste water outlet, and a water leg for said waste water outlet, the water level in said waste water outlet being adjustable to a level such that a pressure exists in the system such that there is no ingress of air through any leakage openings in the system.

JOHN MANN.